United States Patent [19]
Sakaue

[11] Patent Number: 5,848,662
[45] Date of Patent: Dec. 15, 1998

[54] STRUCTURE FOR CONTROLLING DISPLACEMENT OF VEHICLE PEDAL

[75] Inventor: Yuichi Sakaue, Toyota, Japan

[73] Assignee: Toyota Jidosha Kabushiki Kaisha, Toyota, Japan

[21] Appl. No.: 877,212

[22] Filed: Jun. 17, 1997

[30] Foreign Application Priority Data

Jun. 27, 1996 [JP] Japan ................................. 8-167728

[51] Int. Cl.$^6$ ............................. B60T 7/06; B60T 7/22; B60R 21/09
[52] U.S. Cl. ......................... 180/274; 180/275; 280/784; 296/189; 74/512
[58] Field of Search ................................. 180/274, 275; 280/784, 748, 752, 753; 296/189; 188/371, 377; 74/512

[56] References Cited

U.S. PATENT DOCUMENTS

| | | | |
|---|---|---|---|
| 1,410,947 | 3/1922 | Meltzer | 180/275 |
| 3,945,672 | 3/1976 | Wong | 180/275 |
| 4,410,212 | 10/1983 | Sturtz et al. | 280/784 |
| 5,615,749 | 4/1997 | Kato | 180/274 |

FOREIGN PATENT DOCUMENTS

| | | |
|---|---|---|
| A1-3904616 | 8/1989 | Germany . |
| A1-4409235 | 10/1994 | Germany . |
| U-1-73464 | 5/1989 | Japan . |

*Primary Examiner*—Peter C. English
*Attorney, Agent, or Firm*—Oliff & Berridge, PLC

[57] ABSTRACT

A structure for controlling displacement of a vehicle pedal, comprising: a vehicle pedal supported at a pedal bracket fixed to a vehicle body, and swinging around a rotating shaft portion disposed further substantially toward a rear of a vehicle and toward a bottom of the vehicle than an upper end portion of the vehicle pedal which upper end portion is at an opposite side of a lower end portion at which a stepping surface is provided; and a displacement controlling device, provided at a load receiving portion which is disposed further substantially toward a front of the vehicle than the vehicle pedal, for controlling displacement of the stepping surface of the vehicle pedal by displacing the upper end portion of the vehicle pedal substantially toward a rear of the vehicle when there is displacement of the load receiving portion in at least one of a direction substantially toward the rear of the vehicle and a direction substantially toward a top of the vehicle at the time when an external force of a predetermined value or greater is applied to a front portion of the vehicle and the load receiving portion is displaced in at least one of the direction substantially toward the rear of the vehicle and the direction substantially toward the top of the vehicle.

19 Claims, 5 Drawing Sheets

STRUCTURE FOR CONTROLLING DISPLACEMENT OF VEHICLE PEDAL

BACKGROUND OF THE INVENTION

1. Field of the Invention

The present invention relates to a structure for controlling the displacement of a vehicle pedal.

2. Description of the Related Art

Various conventional structures have been devised as countermeasures for the time an external force of a predetermined value or greater is applied from the front of a vehicle. Examples of such countermeasures include German Patent Application Laid-Open Nos. 4,409,235 and 3,904,616, which disclose structures for pushing a pedal from the rear of the vehicle, and Japanese Utility Model Application Laid-Open (JP-U) No. 1-73464.

Figure 5:
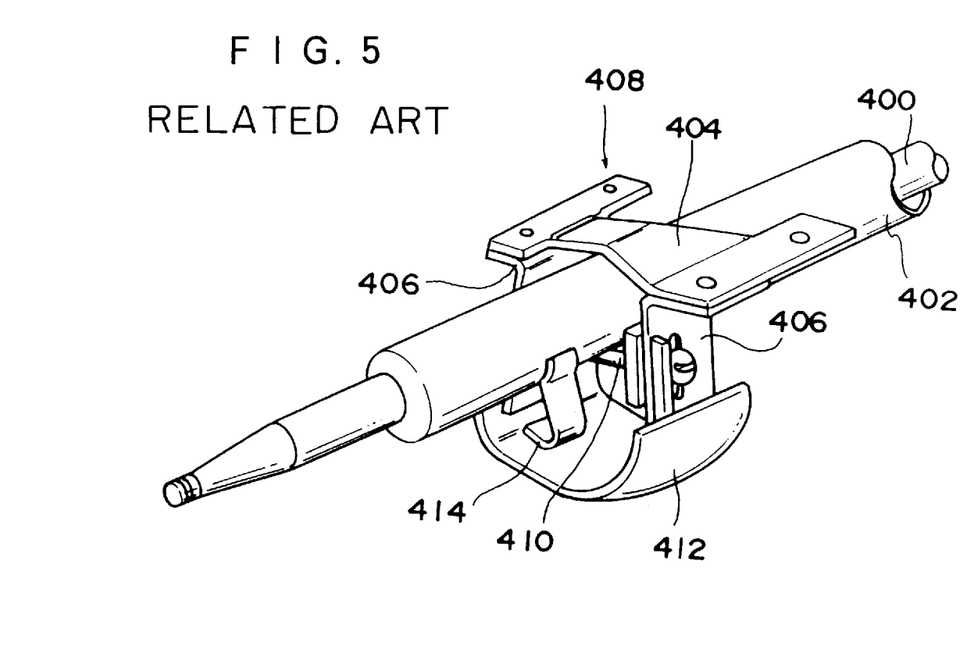
FIG. 5 is a perspective view illustrating a conventional structure.

The structure disclosed in JP-U No. 1-73464 will be described hereinafter. As illustrated in FIG. 5, in the structure disclosed in JP-U No. 1-73464, a steering column 402 which covers a steering shaft 400 is supported at a vehicle body by a tilt bracket 408 and a shaft 410. The tilt bracket 408 is formed from an upper plate member 404 and a pair of side plate members 406. The shaft 410 passes through the side plate members 406 and supports the lower side of the steering column 402.

A knee protector 412, which is shaped as a substantially circular arc-shaped surface and is elastically deformable, is disposed beneath the tilt bracket 408. The knee protector 412 is elastically supported at the lower side of the steering column 402 via an elastically deformable stay 414.

In accordance with the above-described structure, when an external force of a predetermined value or greater is applied from the front of the vehicle, a vehicle occupant starts to inertially move toward the front of the vehicle, and accordingly, the legs of the vehicle occupant start to inertially move in the same direction while bending with the knees as the starting point of bending. Therefore, if the knee protector 412 were not provided, the driver's knees might contact the tilt bracket 408. However, if the knee protector 412 is provided beneath the tilt bracket 408 as described above, the driver's knees only contact the knee protector 412.

This structure in which the knee protector 412 is provided is useful as a countermeasure at the time that an external force of a predetermined value or greater is applied from the front of the vehicle. However, countermeasures for protecting the legs of the vehicle occupant can also be studied from other points of view.

The present inventors conceived of the idea of the present invention from this standpoint, conducted various experiments, and arrived upon extremely effective countermeasures which control the displacement of a vehicle pedal such as a brake pedal at the time that an external force of a predetermined value or greater is applied from the front of the vehicle, by focusing on the deformation and the displacement behavior of the body panel and the like at the time such an external force is applied.

SUMMARY OF THE INVENTION

In view of the aforementioned, an object of the present invention is to provide a structure for controlling displacement of a vehicle pedal which can control the displacement of the stepping surface of a vehicle pedal at the time that an external force of a predetermined value or greater is applied from the front of the vehicle.

A first aspect of the present invention is a structure for controlling displacement of a vehicle pedal, comprising: a vehicle pedal supported at a pedal bracket fixed to a vehicle body, and swinging around a rotating shaft portion disposed further substantially toward a bottom of a vehicle than an upper end portion of the vehicle pedal which upper end portion is at an opposite side of a lower end portion at which a stepping surface is provided; and displacement controlling means, provided at a load receiving portion which is disposed further substantially toward a front of the vehicle than the vehicle pedal, for controlling displacement of the stepping surface of the vehicle pedal by converting rearward displacement of the load receiving portion into displacement of the upper end portion of the vehicle pedal substantially toward a rear of the vehicle when external force of a predetermined value or greater is applied to a front portion of the vehicle and the load receiving portion is displaced substantially toward the rear of the vehicle.

A second aspect of the present invention is a structure for controlling displacement of a vehicle pedal comprising: a vehicle pedal supported at a pedal bracket fixed to a vehicle body, and swinging around a rotating shaft portion disposed further substantially toward a bottom of a vehicle than an upper end portion of the vehicle pedal which upper end portion is at an opposite side of a lower end portion at which a stepping surface is provided; and displacement controlling means, provided at a load receiving portion which is disposed further substantially toward a front of the vehicle than the vehicle pedal, for controlling displacement of the stepping surface of the vehicle pedal by converting upward displacement of the load receiving portion into displacement of the upper end portion of the vehicle pedal substantially toward a rear of the vehicle when external force of a predetermined value or greater is applied to a front portion of the vehicle and the load receiving portion is displaced substantially toward a top of the vehicle.

A third aspect of the present invention is a structure for controlling displacement of a vehicle pedal, comprising: a vehicle pedal supported at a pedal bracket fixed to a vehicle body, and swinging around a rotating shaft portion disposed further substantially toward a rear of a vehicle and a bottom of the vehicle than an upper end portion of the vehicle pedal which upper end portion is at an opposite side of a lower end portion at which a stepping surface is provided; and displacement controlling means, provided at a load receiving portion which is disposed further substantially toward a front of the vehicle than the vehicle pedal, for controlling displacement of the stepping surface of the vehicle pedal by displacing the upper end portion of the vehicle pedal substantially toward a rear of the vehicle when there is displacement of the load receiving portion in at least one of a direction substantially toward the rear of the vehicle and a direction substantially toward a top of the vehicle at the time when an external force of a predetermined value or greater is applied to a front portion of the vehicle and the load receiving portion is displaced in at least one of the direction substantially toward the rear of the vehicle and the direction substantially toward the top of the vehicle.

In accordance with the first aspect, when an external force of a predetermined value or greater is applied to the front portion of the vehicle, the external force is input to the load receiving portion which is disposed further substantially toward the front of the vehicle than the vehicle pedal. The load receiving portion may therefore be displaced substantially toward the rear of the vehicle.

In this case, in accordance with the first aspect, the rearward displacement of the load receiving portion is converted by the displacement controlling means into displacement of the upper end portion of the vehicle pedal substantially toward the rear of the vehicle. As a result, the stepping surface of the vehicle pedal receives rotating force substantially toward the front of the vehicle and around the rotating shaft portion. In this way, the displacement of the stepping surface of the vehicle pedal at the time when an external force of a predetermined value or greater is applied to the front portion of the vehicle is controlled so as to become displacement substantially toward the front of the vehicle.

In accordance with the first aspect, the upper end portion of the vehicle pedal, which is at the side opposite to the lower end portion at which the stepping surface of the vehicle pedal is provided (i.e., the upper end portion is the end portion above the rotating shaft portion), is displaced substantially toward the rear of the vehicle by the displacement controlling means. Therefore, a superior effect is achieved in that, due to the ratio between the distance from the rotating shaft portion of the vehicle pedal to the upper end portion of the vehicle pedal and the distance from the rotating shaft portion to the stepping surface, the stepping surface of the vehicle pedal can reliably and effectively be displaced substantially toward the front of the vehicle even if the amount of displacement of the upper end portion of the vehicle pedal substantially toward the rear of the vehicle is small.

In accordance with the first aspect, for the above reasons, an excellent effect is achieved in that there is no need to make the foot space for the operation pedals small as compared to a structure in which the stepping surface of the vehicle pedal is pressed substantially from the rear of the vehicle substantially toward the front of the vehicle.

In accordance with the second aspect of the present invention, when an external force of a predetermined value or greater is applied to the front portion of the vehicle, the external force is inputted to the load receiving portion which is disposed further substantially toward the front of the vehicle than the vehicle pedal. The load receiving portion may be displaced substantially toward the top of the vehicle.

In this case, in accordance with the second aspect, the upward displacement of the load receiving portion is converted by the displacement controlling means into displacement of the upper end portion of the vehicle pedal substantially toward the rear of the vehicle. As a result, the stepping surface of the vehicle pedal receives rotating force substantially toward the front of the vehicle and around the rotating shaft portion. In this way, the displacement of the stepping surface of the vehicle pedal at the time when an external force of a predetermined value or greater is applied to the front portion of the vehicle is controlled so as to become displacement substantially toward the front of the vehicle.

In the second aspect, for the same reasons as in the first aspect, excellent effects are achieved in that the stepping surface of the vehicle pedal can be displaced reliably and effectively substantially toward the front of the vehicle with a small amount of displacement, and there is no need to make the foot space for operating the pedals small.

In accordance with the third aspect, when an external force of a predetermined value or greater is applied to the front portion of the vehicle, the external force is applied to the load receiving portion which is disposed further substantially toward the front of the vehicle than the vehicle pedal. In this way, the load receiving portion may be displaced substantially toward the rear of the vehicle, or may be displaced substantially toward the top of the vehicle.

In this case, in accordance with the third aspect, regardless of whether the displacement of the load receiving portion is substantially toward the rear of the vehicle or substantially toward the top of the vehicle, the upper end portion of the vehicle pedal is displaced substantially toward the rear of the vehicle. As a result, either in a case in which the load receiving portion is displaced substantially toward the rear of the vehicle or in a case in which the load receiving portion is displaced substantially toward the top of the vehicle, the stepping surface of the vehicle pedal receives rotational force substantially toward the front of the vehicle and around the rotating shaft portion. In this way, the displacement of the stepping surface of the vehicle pedal at the time that an external force of a predetermined value or greater is applied to the front portion of the vehicle is controlled so as to become displacement substantially toward the front of the vehicle.

More specifically, in the third aspect, due to a single displacement controlling means, the displacement of the stepping surface of the vehicle pedal can be controlled so as to become displacement substantially toward the front of the vehicle either in a case in which the load receiving portion is displaced substantially toward the rear of the vehicle or in a case in which the load receiving portion is displaced substantially toward the top of the vehicle.

Further, in the third aspect, for the same reasons as in the first aspect, superior effects are achieved in that the stepping surface of the vehicle pedal can be displaced reliably and effectively substantially toward the front of the vehicle with a small displacement amount, and there is no need to make the foot space for operating the pedals small.

In the third aspect, due to a single displacement controlling means, the displacement of the stepping surface of the vehicle pedal can be controlled so as to become displacement substantially toward the front of the vehicle both in a case in which the load receiving portion is displaced substantially toward the rear of the vehicle and in a case in which the load receiving portion is displaced substantially toward the top of the vehicle. Therefore, a superior effect is achieved in that the structure can be made simple as compared to a structure in which a separate displacement controlling means is provided independently for each case.

DESCRIPTION OF THE PREFERRED EMBODIMENTS

An embodiment of the first through third aspects of the present invention will be described hereinafter with reference to FIGS. 1 through 4. Note that, in the drawings, the arrow FRONT points toward the front of the vehicle, and the arrow UP points toward the top of the vehicle.

Figure 1:
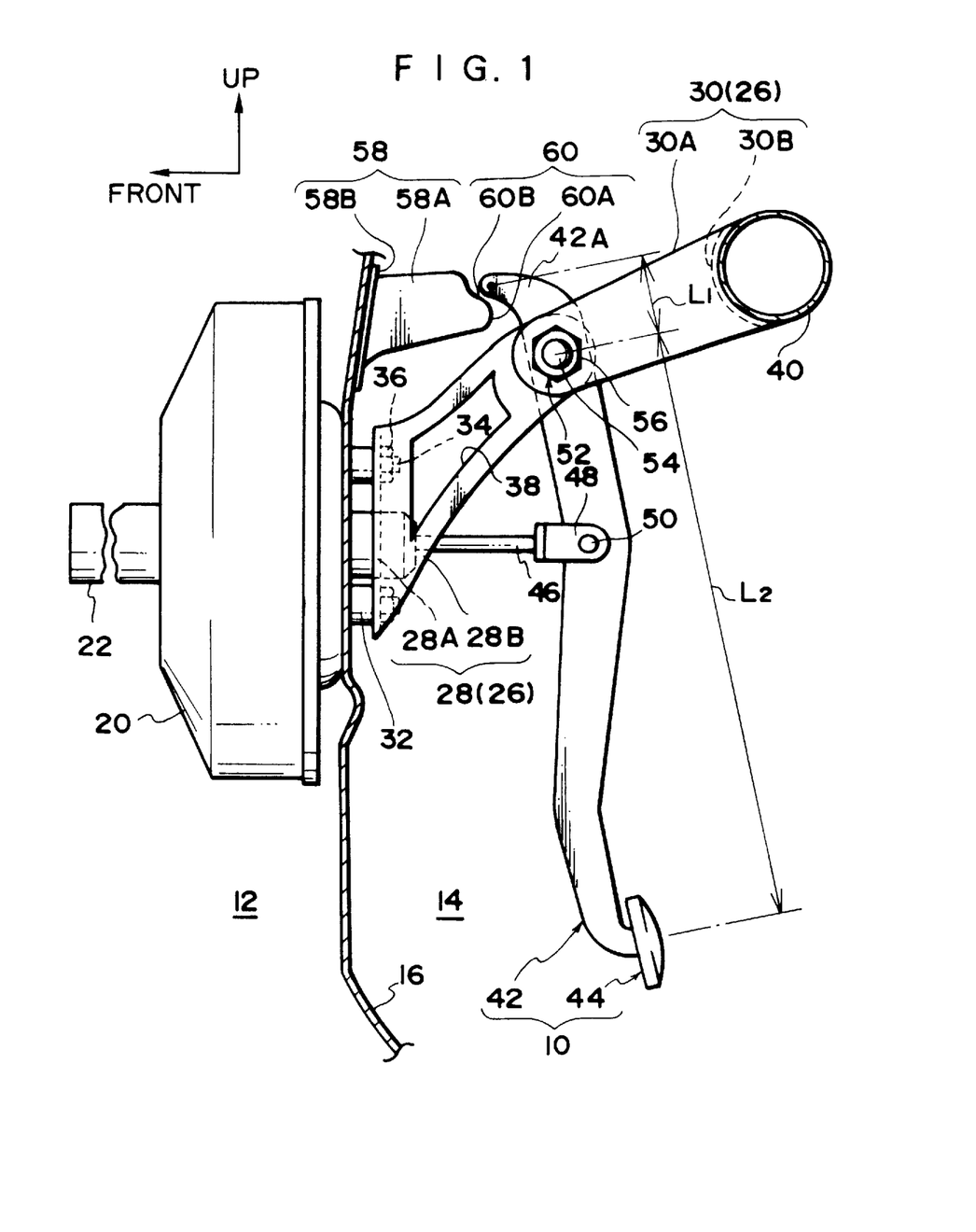
FIG. 1 is a side view illustrating an overall construction of a structure for controlling displacement of a vehicle pedal relating to an embodiment of the present invention.

The structure of the periphery of a suspended-type brake pedal 10 as viewed from the side is illustrated schematically in FIG. 1. As can be seen in the figure, a dash panel 16 is disposed at a position at which the dash panel 16 partitions an engine room 12 and a vehicle compartment interior space 14, such that the surface direction of the dash panel 16 is substantially vertical. An upper end portion of the dash panel 16 is fixed by spot welding or the like to a cowl inner panel which forms a portion of the cowl and which is disposed such that the longitudinal direction thereof is the substantially transverse direction of the vehicle (i.e., the direction normal to the plane of the paper of FIG. 1). The lower end portion of the dash panel 16 is fixed by spot welding or the like to an unillustrated floor panel.

A brake booster 20, a master cylinder 22, and an unillustrated reservoir tank are disposed integrally at the side of the dash panel 16 toward the front of the vehicle. The brake booster 20 augments the stepping force of the driver applied to the brake pedal 10. The master cylinder 22 converts the pressure augmented by the brake booster 20 into hydraulic pressure. The reservoir tank houses and replenishes brake fluid in accordance with changes in the volume of the hydraulic pressure system.

A pedal bracket 26 which supports the brake pedal 10 such that the brake pedal 10 is swingable is disposed at the side of the dash panel 16 toward the rear of the vehicle. The pedal bracket 26 is divided into the following two sections in the longitudinal direction of the vehicle: a front bracket 28 and a rear bracket 30.

The front bracket 28 which is disposed at the front side is formed by a base plate portion 28A and a pair of side plate portions 28B, and has a substantially U-shaped configuration as seen in plan view. The base plate portion 28A is disposed parallel to the dash panel 16. The pair of side plate portions 28B are bent from the vehicle transverse direction ends of the base plate portion 28A, and extend substantially parallel to one another substantially toward the rear of the vehicle. A through-hole of a predetermined radial dimension is formed in a central portion of the base plate portion 28A. Cylindrical collars 32 are fixed to the four corners of the surface of the base plate portion 28A toward the dash panel 16. In a state in which the collars 32 are abutted against the dash panel 16, stud bolts 34 projecting from the brake booster 20 are inserted relatively into the collars 32, and nuts 36 are screwed together with the stud bolts 34 from the rear side surface of the base plate portion 28A. In this way, the front end side of the front bracket 28 is joined and fixed to the dash panel 16. Further, an opening portion 38, which has a predetermined configuration and serves as a weakening portion, is formed in each of the side plate portions 28B. In this way, the rigidity of the front bracket 28 in the substantially longitudinal direction of the vehicle is intentionally set low.

The front bracket 28 may also be fixed to the dash panel 16 by weld nuts being welded in advance to the front side surface of the dash panel 16, and mounting bolts being screwed into the weld nuts from the base plate portion 28A side. Further, in the present embodiment, the front bracket 28 is formed integrally by a single plate being bent appropriately. However, a structure in which the respective portions are formed by respective parts which are made integral by welding or the like may also be employed.

The rear bracket 30 of the pedal bracket 26 is formed by a pair of arm portions 30A and a mounting portion 30B so as to have a substantially U-shaped configuration as seen in plan view. The pair of arm portions 30A extend substantially parallel to one another substantially toward the rear of the vehicle, and are disposed at the outer sides of the rear end portions of the pair of side plate portions 28B of the front bracket 28. The mounting portion 30B connects the rear end portions of the arm portions 30A, and has a curved surface configuration which curves along the curved surface configuration of an instrument panel reinforcement 40 which is a high strength member disposed substantially along the transverse direction of the vehicle. The mounting portion 30B is fixed by spot welding or the like to the instrument panel reinforcement 40. The rigidity of the pair of arm portions 30A in the substantially longitudinal direction of the vehicle is set high.

The brake pedal 10 is disposed between the rear end portions of the front bracket 28 of the pedal bracket 26 (i.e., between the front end portions of the rear bracket 30). The brake pedal 10 includes a pedal supporting portion 42 and a pedal pad 44. The pedal supporting portion 42 is formed by appropriately bending a narrow plate member. The pedal pad 44 is provided at the lower end portion of the pedal supporting portion 42 and the stepping force of the driver is applied thereto. An unillustrated return spring is anchored to the pedal supporting portion 42 of the brake pedal 10 so as to always urge the brake pedal 10 in a direction of returning to its original position. The distal end portion of a push rod (operating rod) 46, which projects from the brake booster 20 and passes through the dash panel 16, is connected to an intermediate portion of the pedal supporting portion 42 of the brake pedal 10 by a clevis 48, which is substantially U-shaped in plan view, and a clevis pin 50 such that the pedal supporting portion 42 can rotate freely relatively to the push rod 46.

A rotating shaft portion 52 is provided in a vicinity beneath an upper end portion 42A of the pedal supporting portion 42 of the brake pedal 10. An example of the structure of the rotating shaft portion 52 is as follows. A substantially cylindrical pedal boss is inserted into a through hole formed in a vicinity beneath the upper end portion 42A of the pedal supporting portion 42. A cylindrical bushing is fit in each end portion of the pedal boss. A cylindrical collar is inserted into both bushings. Thereafter, a mounting bolt 54 is inserted from the outer side of one of the arm portions 30A of the rear bracket 30 (the arm portion 30A not illustrated in FIG. 1). A nut 56 is screwed together with the mounting bolt 54 from the outer side of the other arm portion 30A. In this way, the rotating shaft portion 52 of the pedal supporting portion 42 of the brake pedal 10 is swingably supported at the pair of side plate portions 28B of the front bracket 28 and at the pair of arm portions 30A of the rear bracket 30.

A substantially box-shaped pusher member 58 is disposed at the surface of the dash panel 16 above the front bracket 28. The pusher member 58 is formed by a main body portion 58A, which is substantially box-shaped, and a flange portion 58B for mounting, which is formed at the front end portion of the main body portion 58A. By fixing the flange portion 58B to the dash panel 16 by spot welding or the like, the pusher member 58 is mounted to the dash panel 16.

A stepped portion 60, which is substantially shaped as stairs as seen in side view, is formed integrally at the rear end wall of the main body portion 58A of the pusher member 58. The stepped portion 60 includes a rear end surface 60A and an upper end surface 60B which respectively have gently curved configurations. The upper end portion 42A of the pedal supporting portion 42 of the brake pedal 10 is disposed so as to oppose the stepped portion 60 in the substantially longitudinal direction of the vehicle. In an ordinary brake pedal, because the rotating shaft portion 52 is disposed at the upper end portion of the pedal supporting portion, the upper end portion of the ordinary pedal supporting portion is positioned at the position of the rotating shaft portion 52. However, in the present embodiment, the upper end portion of the pedal supporting portion is curved and extends further substantially toward the top of the vehicle and further substantially toward the front of the vehicle than the rotating shaft portion 52. Therefore, the upper end portion 42A of the pedal supporting portion 42 is formed so as to be disposed to oppose the stepped portion 60 of the pusher member 58. Further, in the present embodiment, a distance $L_2$ from the rotating shaft portion 52 to the pedal pad 44 is set to be sufficiently large with respect to a distance $L_1$ from the rotating shaft portion 52 to the upper end portion 42A.

In the present embodiment, the transverse direction dimension of the stepped portion 60 of the pusher member 58 is set to be greater than the transverse direction dimension (thickness) of the upper end portion 42A of the brake pedal 10. However, the transverse direction dimension of the upper end portion 42A of the brake pedal 10 may be set to be greater than the transverse direction dimension of the stepped portion 60.

Next, the operation and effects of the present embodiment will be described. The state in FIG. 1 is an assembled state of the brake pedal 10 and is a state in which the brake pedal 10 is not operated. In this state, the brake pedal 10 is held at an initial position by the urging force of the return spring. When the driver applies stepping force to the pedal pad 44 of the pedal bracket 10 in this state, the brake pedal 10 is swung substantially toward the front of the vehicle (i.e., clockwise) around the rotating shaft portion 52, and the push rod 46 is pushed substantially toward the front of the vehicle. In this way, the stepping force which the driver applies to the pedal pad 44 is augmented by the brake booster 20.

Figure 2:
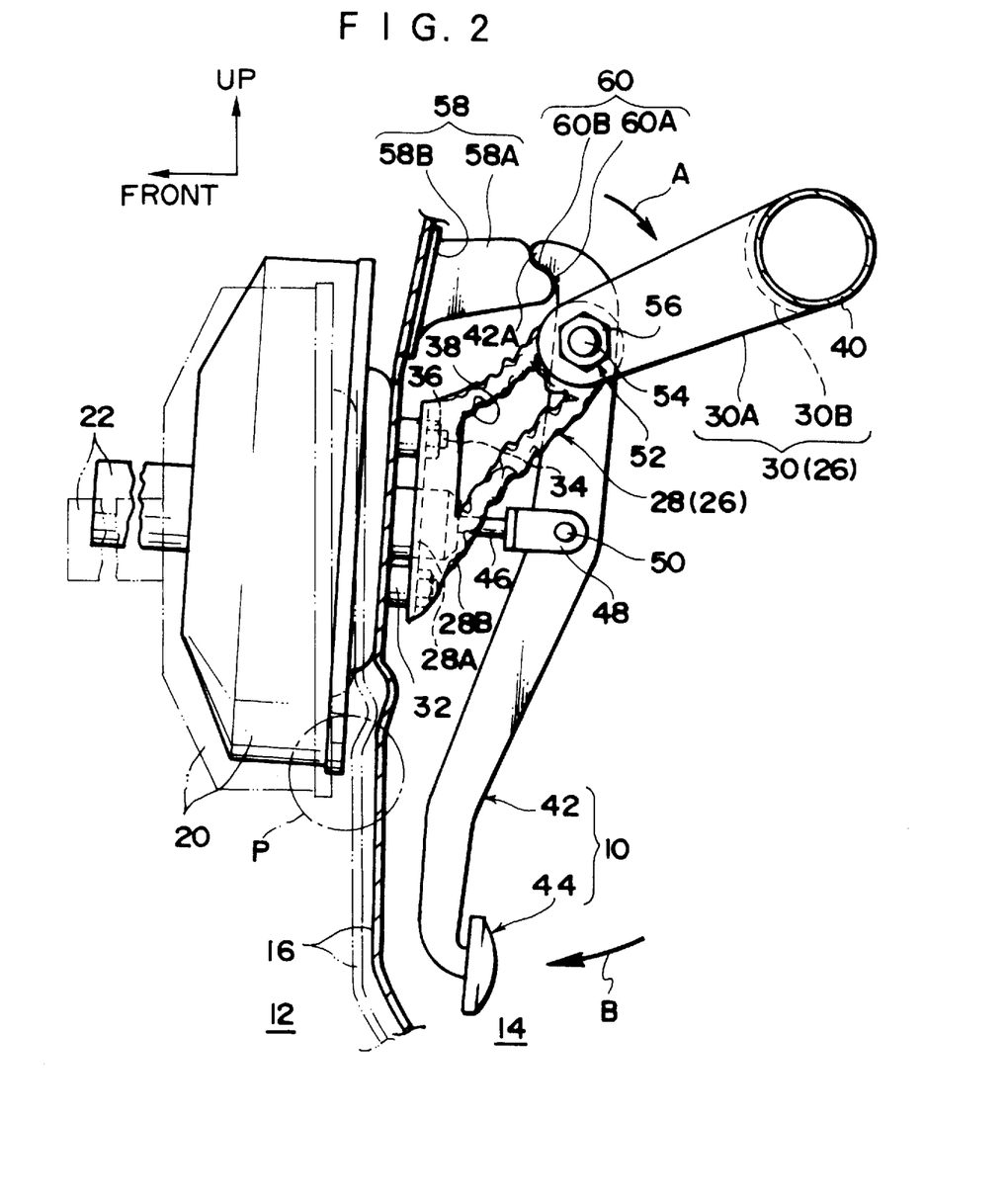
FIG. 2 is a side view corresponding to FIG. 1 and illustrating operation at the structure for controlling displacement of a vehicle pedal relating to the embodiment of the present invention, in a case in which an external force of a predetermined value or greater is applied from the front of a vehicle and a dash panel is displaced substantially toward the rear of the vehicle.

Here, when an external force of a predetermined value or greater is applied from the front of the vehicle, the external force is a inputted to the dash panel 16, which is load-receiving portion, via the master cylinder 22 and the brake booster 20 which are disposed further substantially toward the front of the vehicle than the brake pedal 10. In this case, as illustrated in FIG. 2, the dash panel 16 may be displaced substantially toward the rear of the vehicle while tilting slightly about a vicinity of the lower end portion of the brake booster 20 (the portion indicated by the letter P in FIG. 2). More specifically, when an external force of a predetermined value or greater is applied from the front of the vehicle, the amount of rearward displacement of the instrument panel reinforcement 40, which is a high strength member, is small, whereas the amount of rearward displacement of the dash panel 16 is relatively large compared with that of the instrument panel reinforcement 40. Therefore, a buckling load is inputted to the pedal bracket 26. In this case, in the present embodiment, the rigidity of the rear bracket 30 in the substantially longitudinal direction of the vehicle is set high, whereas the rigidity of the front bracket 28 in the substantially longitudinal direction of the vehicle is set low. Therefore, when the buckling load is inputted to the pedal bracket 26, the rear bracket 30 does not buckle, and only the front bracket 28 buckles in the substantially longitudinal direction of the vehicle as the dash panel 16 is displaced toward the rear of the vehicle.

Figure 3:
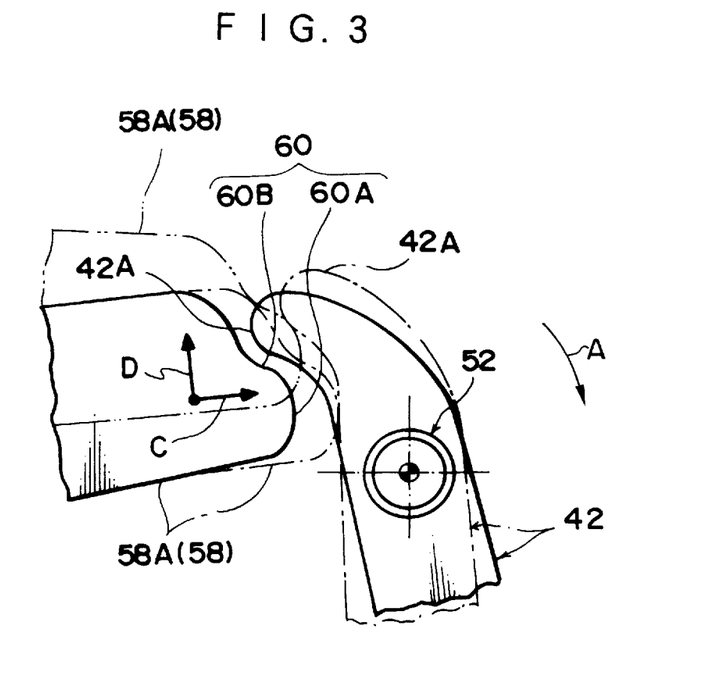
FIG. 3 is an enlarged side view of main portions in which a pusher member and an upper end portion of a brake pedal illustrated in FIG. 1 are enlarged.

As described above, due to the rearward displacement of the dash panel 16, the stepped portion 60 of the pusher member 58 disposed above the front bracket 28 also is displaced substantially toward the rear of the vehicle (in the direction of arrow C in FIG. 3 which is an enlarged view of main portions). As a result, as illustrated by the one-dot chain line in FIG. 3, the rear end surface 60A of the stepped portion 60 abuts the front surface of the upper end portion 42A of the brake pedal 10, and the upper end portion 42A is pushed substantially toward the rear of the vehicle. As a result, the upper end portion 42A of the brake pedal 10 receives rotating force substantially toward the rear of the vehicle (in the direction of arrow A) around the rotating shaft portion 52, and the pedal pad 44 receives rotating force substantially toward the front of the vehicle (in the direction of arrow B in FIG. 2). Accordingly, in this case, the rearward displacement of the dash panel 16 is, by the pusher member 58, converted into displacement of the upper end portion 42A of the brake pedal 10 substantially toward the rear of the vehicle. The pusher member 58 corresponds to the displacement controlling means of the present invention.

Figure 4:
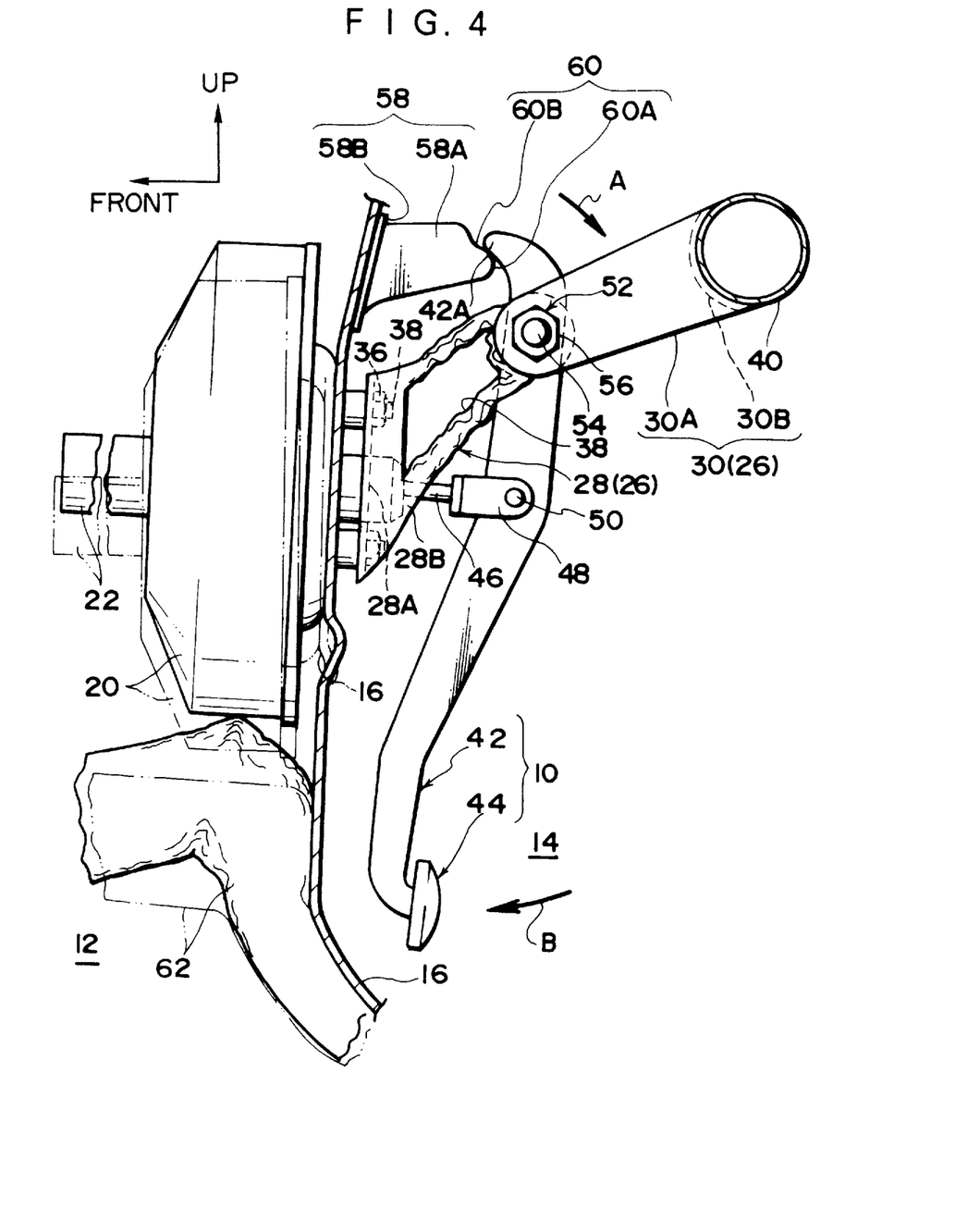
FIG. 4 is a side view corresponding to FIG. 2 and illustrating operation at the structure for controlling displacement of a vehicle pedal relating to the embodiment of the present invention, in a case in which an external force of a predetermined value or greater is applied from the front of the vehicle and the dash panel is displaced substantially toward the top of the vehicle.

When external force of a predetermined value or greater is applied from the front of the vehicle, there are cases in which the dash panel 16, which is the load receiving portion, is not displaced rearwardly but is displaced substantially toward the top of the vehicle. An example of such a case is the following case which is illustrated in FIG. 4. When an external force of a predetermined value or greater is applied from the front of the vehicle, the external force is inputted to front side members 62 which are disposed substantially parallel to one another at the side portions of the front portion of the vehicle body. The front side members 62 deform substantially toward the top of the vehicle from the state illustrated by the two-dot chain line to the state illustrated by the solid line. Due to this deformation, the brake booster 20 is pushed upward substantially toward the top of the vehicle. As can be understood from the two-dot chain line configuration in FIG. 4, an intermediate portion of the front side member 62, which is disposed such that the longitudinal direction thereof is the substantially longitudinal direction of the vehicle, is joined to the front end surface of the dash panel 16, and a portion of the front side member 62 further toward the rear side than the intermediate portion thereof is positioned beneath the dash panel 16 and extends to beneath the side portion of the floor panel. When such a front side member 62 is used, the front side member 62 is bent at the region at which the front side member 62 and the dash panel 16 are connected. Therefore, the front side member 62 deforms substantially toward the top of the vehicle with this bent region being the starting point of deformation.

As described above, when the dash panel 16 is displaced substantially toward the top of the vehicle due to the movement of the brake booster 20 substantially toward the top of the vehicle, the pusher member 58 is also displaced substantially toward the top of the vehicle (i.e., in the direction of arrow D in FIG. 3). As a result, as illustrated by the two-dot chain line in FIG. 3, the upper end surface 60B of the stepped portion 60 of the pusher member 58 interferes with the lower surface of the upper end portion 42A of the brake pedal 10, and the upper end portion 42A is pushed substantially toward the top of the vehicle. Accordingly, in the same way as in the previously-described case, the upper end portion 42A of the brake pedal 10 receives rotating force substantially toward the rear of the vehicle (i.e., in the direction of arrow A in FIG. 4) around the rotating shaft portion 52, and the pedal pad 44 receives rotating force substantially toward the front of the vehicle (i.e., in the direction of arrow B in FIG. 4). Accordingly, in this case, the substantially upward displacement of the dash panel 16 is, by the pusher member 58, converted into displacement of the upper end portion 42A of the brake pedal 10 substantially toward the rear of the vehicle. The pusher member 58 corresponds to the displacement controlling means of the present invention.

In accordance with the present embodiment, when external force of a predetermined value or greater is applied from the front of the vehicle, in a case in which the dash panel 16 is displaced substantially toward the rear of the vehicle and in a case in which the dash panel 16 is displaced substantially toward the top of the vehicle, the upper end portion 42A of the brake pedal 10 is deformed substantially toward the rear of the vehicle, and rotating force substantially toward the front of the vehicle can be applied to the pedal pad 44 of the brake pedal 10. In this way, the pedal pad 44 can be displaced substantially toward the front of the vehicle. As a result, the bending of the knee of the driver due to the inertial movement of the driver at the time an external force of a predetermined value or greater is applied from the front of the vehicle can be suppressed, and therefore, the knee of the driver can be kept away from the steering column.

Further, in accordance with the present embodiment, the pedal pad 44 can be displaced substantially toward the front of the vehicle both in a case in which the dash panel 16 is displaced substantially toward the rear of the vehicle and in a case in which the dash panel 16 is displaced substantially toward the top of the vehicle, due to the structure of providing at the dash panel 16 the pusher member 58, which includes the stepped portion 60 having the rear end surface 60A and the upper end surface 60B, and due to the structure in which the configuration of the brake pedal 10 is changed by providing the upper end portion 42A which is disposed so as to oppose the pusher member 58. Namely, the above-described effect of the present embodiment is achieved by an extremely simple structure in which only a single part is newly added. Accordingly, the structure can be simplified, and the cost can be reduced.

In accordance with the present embodiment, the upper end portion 42A of the pedal supporting portion 42 is extended in a curved configuration substantially toward the top of the vehicle and substantially toward the front of the vehicle, in order for pushing force to be applied from the pusher member 58 to the upper end portion 42A of the brake pedal 10. Further, the distance $L_2$ from the rotating shaft portion 52 to the pedal pad 44 is set to be sufficiently greater than the distance $L_1$ from the rotating shaft portion 52 to the upper end portion 42A. Therefore, even if the amount of pushing from the stepped portion 60 of the pusher member 58 is small (i.e., even if the amount of displacement of the stepped portion 60 substantially toward the rear of the vehicle or substantially toward the top of the vehicle is small), the pedal pad 44 can be reliably and effectively displaced substantially toward the front of the vehicle.

In accordance with the present embodiment, for the above-described reasons, the foot space for operating the brake pedal 10 does not have to be made small, in contrast with a case in which the pedal pad 44 or a portion of the pedal supporting portion 42 from the pedal pad 44 to the clevis pin 50 is pushed substantially from the rear of the vehicle substantially toward the front of the vehicle.

In accordance with the present embodiment, the transverse direction dimension of the stepped portion 60 of the pusher member 58 is set greater than the transverse direction dimension (i.e., the width) of the upper end portion 42A of the brake pedal 10. Therefore, even if the dash panel 16 is displaced while being shifted substantially in the transverse direction of the vehicle, the upper end portion 42A of the brake pedal 10 can be reliably displaced substantially toward the rear of the vehicle.

In accordance with the present embodiment, the dash panel 16 and the instrument panel reinforcement 40 are joined by the pedal bracket 26 which is divided into two portions: the front bracket 28 and the rear bracket 30. Therefore, the support rigidity of the instrument panel reinforcement 40 can be improved.

In the present embodiment, the present invention is applied to a suspended-type main brake pedal. However, the present invention is not limited to the same, and may also be applied to a suspended-type clutch pedal or a suspended-type parking brake pedal or the like.

In the present embodiment, in order to address both a case in which the dash panel 16 is displaced substantially toward the rear of the vehicle and a case in which the dash panel 16 is displaced substantially toward the top of the vehicle, the stepped portion 60 having the rear end surface 60A and the upper end surface 60B is provided at the pusher member 58, and the upper end portion 42A of the brake pedal 10 is not only extended substantially toward the top of the vehicle, but also has a curved configuration so as to extend substantially toward the front of the vehicle. However, if it suffices to displace the pedal pad 44 substantially toward the front of the vehicle only when the dash panel 16 is displaced substantially toward the rear of the vehicle, there is no particular need to provide the stepped portion 60 at the pusher member 58, and it suffices for the upper end portion 42A of the brake pedal 10 to be extended substantially toward the top of the vehicle. Similarly, if it suffices to displace the pedal pad 44 substantially toward the front of the vehicle only in a case in which the dash panel 16 is displaced substantially toward the top of the vehicle, there is no particular need to provide the stepped portion 60 at the pusher member 58, and it suffices for the upper end portion 42A of the brake pedal 10 to extend from the vicinity of the rotating shaft portion 52 substantially toward the front of the vehicle, and for the pusher member 58 to be provided therebeneath.

In the present embodiment, a structure is employed in which the pusher member 58 is mounted to the dash panel 16. However, the present invention is not limited to the same, and it suffices to provide the pusher member 58 at a member which receives load when an external force of a predetermined value or greater is applied from the front of the vehicle. For example, a member which corresponds to the pusher member 58 may be provided at the cowl inner panel. Further, a member corresponding to the pusher member 58 may be provided at the base plate portion 28A of the front bracket 28 of the pedal bracket 26, which base plate portion 28A is a portion which is displaced in the same way as the dash panel 16 without buckling and deforming. Moreover, a member corresponding to the pusher member 58 may be provided at the brake booster 20 or the master cylinder 22 or the like, and may pass through the dash panel 16. In these cases, the cowl inner panel, the base plate portion 28A of the pedal bracket 26, the brake booster 20, the master cylinder 22 and the like correspond to the load receiving portions of the first through the third aspects of the present invention.

In the present embodiment, the pusher member 58 is provided as a member separate from the dash panel 16. However, the present invention is not limited to the same, and a projecting portion corresponding to the pusher member 58 may be formed integrally with the dash panel 16 at the time the dash panel 16 is press formed.

What is claimed is:

1. A structure for controlling displacement of a vehicle pedal, comprising:

a vehicle pedal supported at a pedal bracket fixed to a vehicle body, and swinging around a rotating shaft portion disposed further substantially toward a bottom of a vehicle than an upper end portion of said vehicle pedal which upper end portion is at an opposite side of a lower end portion at which a stepping surface is provided; and displacement controlling means, provided at a load receiving portion which is disposed further substantially toward a front of the vehicle than said vehicle pedal, for controlling displacement of the stepping surface of said vehicle pedal by converting rearward displacement of the load receiving portion into displacement of the upper end portion of said vehicle pedal substantially toward a rear of the vehicle when external force of a predetermined value or greater is applied to a front portion of the vehicle and the load receiving portion is displaced substantially toward the rear of the vehicle.

2. A structure for controlling displacement of a vehicle pedal according to claim 1, wherein said displacement controlling means is a pusher member which pushes said vehicle pedal, said pusher member moving toward the rear of the vehicle and pushing the upper end portion of said vehicle pedal toward the rear of the vehicle when the load receiving portion moves toward the rear of the vehicle.

3. A structure for controlling displacement of a vehicle pedal according to claim 1, wherein a vehicle transverse direction dimension of said displacement controlling means is set greater than a vehicle transverse direction dimension of said vehicle pedal.

4. A structure for controlling displacement of a vehicle pedal according to claim 1, wherein a distance from the lower end portion of said vehicle pedal to the rotating shaft portion is set to be greater than a distance from the upper end portion of said vehicle pedal to the rotating shaft portion.

5. A structure for controlling displacement of a vehicle pedal according to claim 1, wherein said displacement controlling means is provided integrally with the load receiving portion.

6. A structure for controlling displacement of a vehicle pedal comprising:

a vehicle pedal supported at a pedal bracket fixed to a vehicle body, and swinging around a rotating shaft portion disposed further substantially toward a bottom of a vehicle than an upper end portion of said vehicle pedal which upper end portion is at an opposite side of a lower end portion at which a stepping surface is provided; and displacement controlling means, provided at a load receiving portion which is disposed further substantially toward a front of the vehicle than said vehicle pedal, for controlling displacement of the stepping surface of said vehicle pedal by converting upward displacement of the load receiving portion into displacement of the upper end portion of said vehicle pedal substantially toward a rear of the vehicle when external force of a predetermined value or greater is applied to a front portion of the vehicle and the load receiving portion is displaced substantially toward a top of the vehicle.

7. A structure for controlling displacement of a vehicle pedal according to claim 6, wherein said displacement controlling means is a pusher member which pushes said vehicle pedal, said pusher member moving toward the top of the vehicle and pushing the upper end portion of said vehicle pedal toward the top of the vehicle when the load receiving portion moves toward the top of the vehicle.

8. A structure for controlling displacement of a vehicle pedal according to claim 7, wherein the upper end portion of said vehicle pedal is provided so as to bend toward the front of the vehicle.

9. A structure for controlling displacement of a vehicle pedal according to claim 6, wherein a vehicle transverse direction dimension of said displacement controlling means is set greater than a vehicle transverse direction dimension of said vehicle pedal.

10. A structure for controlling displacement of a vehicle pedal according to claim 6, wherein a distance from the lower end portion of said vehicle pedal to the rotating shaft portion is set to be greater than a distance from the upper end portion of said vehicle pedal to the rotating shaft portion.

11. A structure for controlling displacement of a vehicle pedal according to claim 6, wherein said displacement controlling means is provided integrally with the load receiving portion.

12. A structure for controlling displacement of a vehicle pedal, comprising:

a vehicle pedal supported at a pedal bracket fixed to a vehicle body, and swinging around a rotating shaft portion disposed further substantially toward a rear of a vehicle and a bottom of the vehicle than an upper end portion of said vehicle pedal which upper end portion is at an opposite side of a lower end portion at which a stepping surface is provided; and displacement controlling means, provided at a load receiving portion which is disposed further substantially toward a front of the vehicle than said vehicle pedal, for controlling displacement of the stepping surface of said vehicle pedal by displacing the upper end portion of said vehicle pedal substantially toward a rear of the vehicle when there is displacement of the load receiving portion in at least one of a direction substantially toward the rear of the vehicle and a direction substantially toward a top of the vehicle at the time when an external force of a predetermined value or greater is applied to a front portion of the vehicle and the load receiving portion is displaced in at least one of the direction substantially toward the rear of the vehicle and the direction substantially toward the top of the vehicle.

13. A structure for controlling displacement of a vehicle pedal according to claim 12, wherein said displacement controlling means is a pusher member which pushes said vehicle pedal, and when the load receiving portion moves in at least one of a direction toward the rear of the vehicle and a direction toward the top of the vehicle, said pusher member moves in the same direction as the load receiving portion and pushes the upper end portion of said vehicle pedal in at least one of the direction toward the rear of the vehicle and the direction toward the top of the vehicle.

14. A structure for controlling displacement of a vehicle pedal according to claim 13, wherein the upper end portion of said vehicle pedal is provided so as to bend toward the front of the vehicle.

15. A structure for controlling displacement of a vehicle pedal according to claim 13, wherein said pusher member has a stepped portion which is provided so as to oppose the upper end portion of said vehicle pedal.

16. A structure for controlling displacement of a vehicle pedal according to claim 15, wherein the stepped portion is provided so as to oppose the upper end portion of said vehicle pedal in a vertical direction of the vehicle and in a longitudinal direction of the vehicle.

17. A structure for controlling displacement of a vehicle pedal according to claim 12, wherein a vehicle transverse direction dimension of said displacement controlling means is set greater than a vehicle transverse direction dimension of said vehicle pedal.

18. A structure for controlling displacement of a vehicle pedal according to claim 12, wherein a distance from the lower end portion of said vehicle pedal to the rotating shaft portion is set to be greater than a distance from the upper end portion of said vehicle pedal to the rotating shaft portion.

19. A structure for controlling displacement of a vehicle pedal according to claim 12, wherein said displacement controlling means is provided integrally with the load receiving portion.

* * * * *